Figure 1:
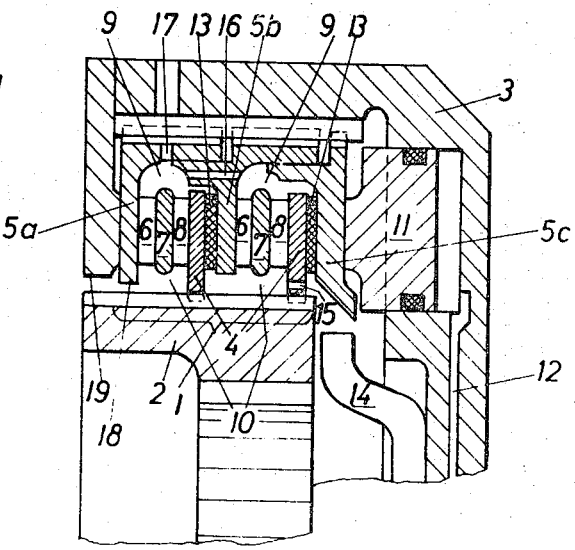

United States Patent

[11] 3,547,235

| [72] | Inventor | Hellmut Weinrich |
| | | Zang Kreis, Heidenheim, Germany |
| [21] | Appl. No. | 761,744 |
| [22] | Filed | Sept. 23, 1968 |
| [45] | Patented | Dec. 15, 1970 |
| [73] | Assignee | Voith Getriebe KG |
| | | Heidenheim (Brenz), Germany |
| [32] | Priority | Sept. 30, 1967 |
| [33] | | Germany |
| [31] | | No. 1,625,837 |

[54] HYDRODYNAMIC AND FRICTION COUPLING
6 Claims, 7 Drawing Figs.

[52] U.S. Cl............................................ 188/271;
 192/3.3, 192/57, 188/90; 192/113
[51] Int. Cl....................................................... F16d 57/00
[50] Field of Search........................................ 192/3.28,
 3.29, 3.3, 3.31, 57, 58A-3, 58A-1; 188/86, 90A

[56] References Cited
UNITED STATES PATENTS

| 1,593,473 | 7/1926 | Rieseler | 192/3.28X |
| 1,858,514 | 5/1932 | Lell | 3.3UX |
| 2,035,576 | 3/1936 | Taylor | 188/86UX |
| 2,577,057 | 12/1951 | White | 192/58A-3 |
| 2,743,792 | 5/1956 | Ransom | 188/90A-5 |
| 2,920,728 | 1/1960 | Forster | 192/3.29 |
| 2,965,202 | 12/1960 | Christenson | 192/3.3 |
| 3,463,281 | 8/1969 | Aschauer | 192/57 |

*Primary Examiner*—Benjamin W. Wyche
*Attorney*—Walter Becker

ABSTRACT: A clutch and brake system, especially for planetary gear transmissions, which includes: primary clutch means comprising primary friction disc means, secondary clutch means comprising secondary friction disc means in substantial axial alignment with said primary friction disc means, said primary and secondary friction disc means respectively being provided with two groups of channel means respectively following the contour of pump and turbine wheels of fluid flow machines, and control means operable selectively to move said primary and secondary friction disc means relatively toward each other for effecting mechanical braking moment while simultaneously making said two groups of channel means effective to bring about a hydrodynamic braking moment.

Fig. 5a
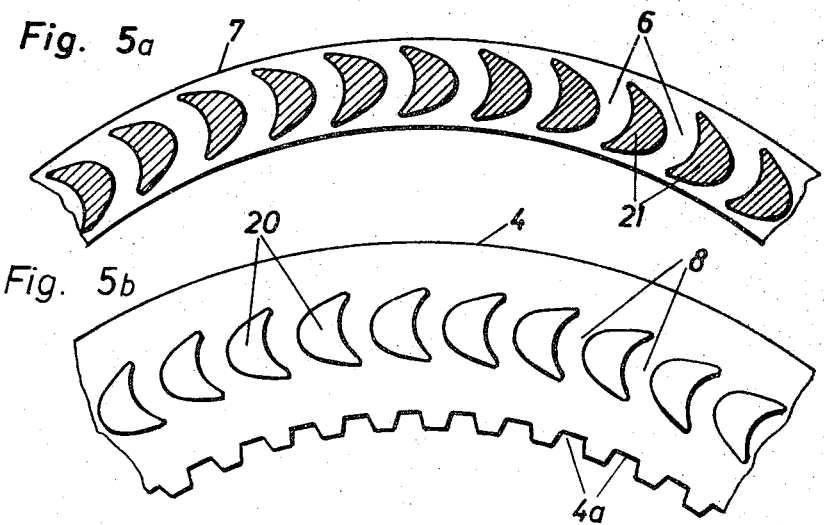
Fig. 5b
Fig. 6
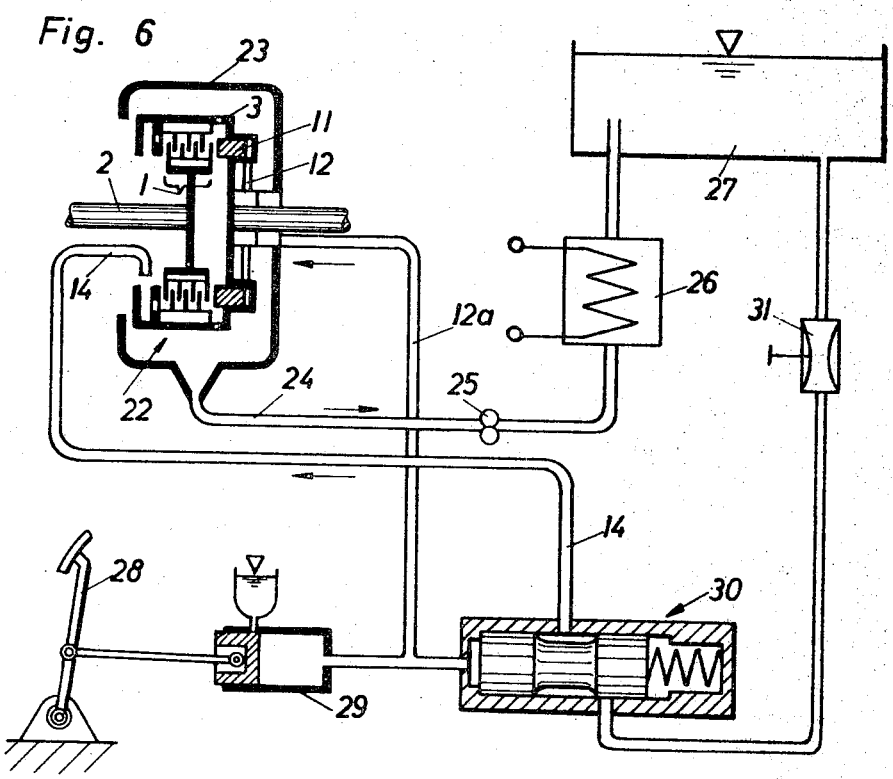
INVENTOR.
BY

HYDRODYNAMIC AND FRICTION COUPLING

The present invention concerns an arrestable brake or a shiftable clutch which in its end position is slip-free and slip-free and in connection with which simultaneously a hydrodynamic or frictional torque transmission may temporarily be employed, and, more specifically concerns a brake or clutch of the above-mentioned type for planetary gear transmissions.

With transmissions which are shiftable under load, the transmission stages are made effective by inserting into the power flow frictional clutches or brakes. In connection with such operations, high synchronization work is performed because the speed adaptation occurs under full load of the drive. In this way, the clutches or brakes are subjected to particularly high stresses, especially at high speed differences or when the transmission members to be synchronized move in opposite directions, which result in increased wear and make such clutches or brakes liable to disturbances while requiring careful servicing.

The possibility of employing hydrodynamic torque transmissions instead of the frictional control elements is in most instances not feasible because such clutches or brakes are effective only synchronously, and cannot convey a torque when slip-free. The parallel arrangement of a hydrodynamic asynchronous clutch and a frictional synchronizing clutch for the above-mentioned example of application would with heretofore known constructions be too expensive from a structural standpoint and would require too much space.

It is, therefore, an object of the present invention to provide an arrestable brake or shiftable clutch which will overcome the above-mentioned drawbacks.

It is another object of this invention to provide a hydrodynamic coupling or brake which will combine the freedom of slip and the good braking effect at low slip of a friction clutch or brake with the good braking effect at high slip values between the transmission elements to be combined without resulting in high costs and increased space.

It is another object of this invention to provide a brake or clutch as set forth in the preceding paragraph in which the developing heat is safely conducted away.

Figure 2:
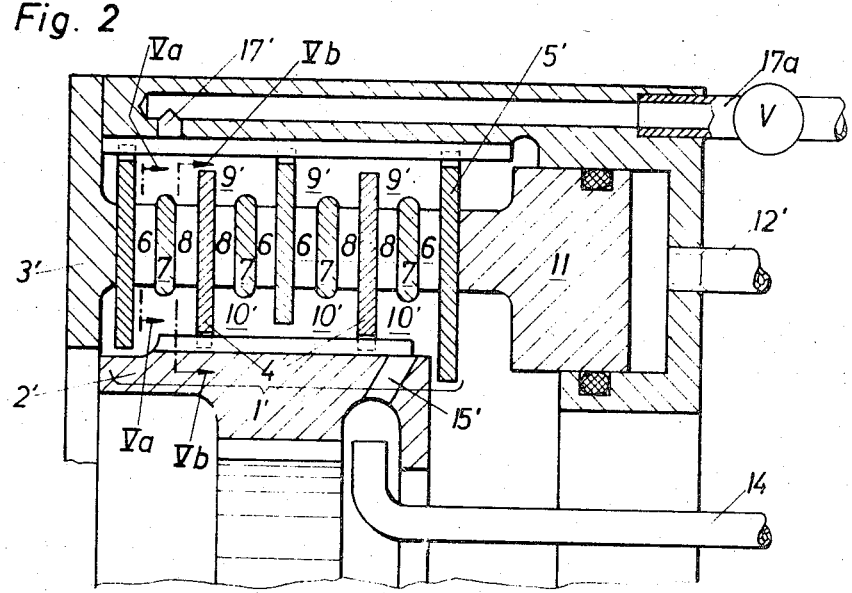
Figure 3:
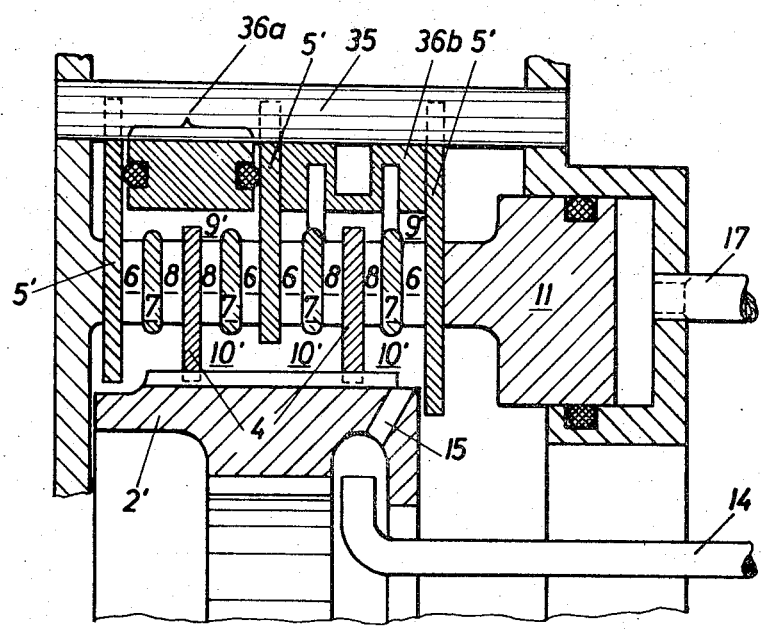
Figure 4:
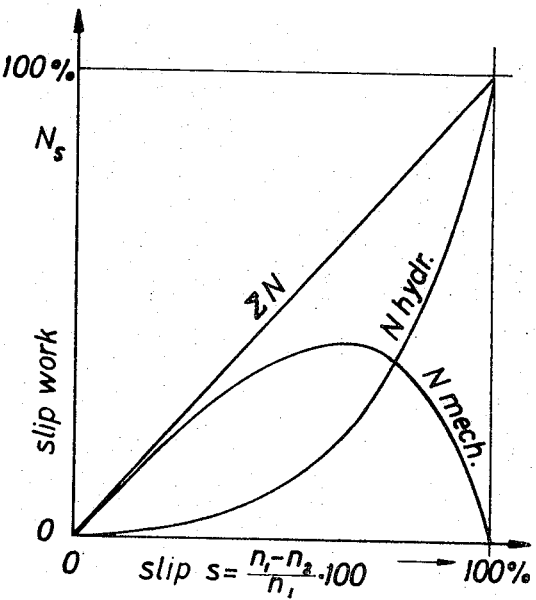

These and other objects and advantages of the invention will appear more clearly from the following specification in connection with the accompanying drawings, in which:

FIGS. 1, 2 and 3 respectively each illustrate a species of friction clutch or brake means having features according to the invention;

FIG. 4 is a diagram illustrating the transmissible slip work;

FIGS. 5a and 5b respectively representing sections along the lines Va–Va and Vb–Vb of FIG. 2 show the design of the pump and turbine wheel passages or stator blade passages; and FIG. 6 diagrammatically illustrates an arrangement for operating a brake or clutch according to the invention.

The brake or clutch according to the present invention is characterized primarily by friction discs which comprise a plurality of passages which in meridial section extend at least approximately radially and are located on a partial circle corresponding at least to the mean diameter of the frictional surfaces, said passages serving as pump or turbine wheel blade passages of a hydrodynamic brake or coupling.

According to a further development of the invention there is suggested a device which simultaneously with the engagement of the frictional elements with each other fills the circuits and, when the pressure acting upon the frictional elements is relieved, empties the circuits.

Referring now to the drawing in detail, the clutch shown in FIG. 1 is provided with a hollow wheel 2 located radially inwardly of the disc packet 1 and pertaining to a planetary gear set (not shown) which by means of the clutch is to be connected with the other clutch member 3. For the sake of simplicity, the parts which move together with the hollow wheel 1 will henceforth be called "primary" parts, and those parts which move together with the other clutch part will henceforth be called "secondary" parts.

The disc packet 1 comprises two primary discs 4 and three secondary discs 5a, 5b and 5c which are axially displaceably but nonrotatably held in a correspondingly splined portion of the clutch member 3. The secondary discs 5a and 5b have radially extending passages 6 in the manner of blade passages and have a plane cover disc 7. The primary discs 4 have merely axially open radially extending passages 8. The cover disc 7 may instead of being arranged on the secondary discs also be arranged on the primary discs. The outwardly fastened discs are crimped or bent aside radially outside the range of the passages and together with said cranked portions form annular chambers 9 which establish communication between the primary and secondary passages at the outer ends thereof. The discs are radially inwardly extended beyond the extension of the passages and together with the inner disc carrier 2 likewise form annular chambers 10 which establish communication between the primary and secondary passages at the inner ends thereof.

By means of the primary passages 8 and secondary passages 6 as well as by the annular reversing chambers 9 and 10, so-to-speak a small Fottinger circuit is formed. When filling the passages and pressing the discs against each other, in addition to the hydrodynamically effected braking moment there will also occur a moment brought about by frictional engagement. This frictional engagement is brought about by the engagement of the webs between the passages 8 and the annular disc 13. In addition thereto, the primary discs 4 are provided with friction linings 13 which cooperate with corresponding friction surfaces on the secondary discs 5b and 5c and in customary manner produce a friction moment.

Arranged in the housing member 3 of the clutch is an axially movable piston 11 which is adapted to receive fluid under pressure through a conduit 12. Simultaneously with a pressing action by the piston 11, the discs of the combined hydrodynamic friction clutch are through conduit 14 and bores 15 and 16 subjected to fluid pressure. Through the bore 17 arranged at the outer circumference of the outer annular chamber of that pair of discs which is remote from the conduit 14, a quantity of transmission fluid is continuously discharged. However, through conduit 14 sufficient oil is always supplied so that the circulating chambers 6, 8, 9 and 10 remain continuously filled. The excessive oil flows over the edges 18 and 19. In addition to the hydrodynamic braking effect, the strong oil circulation during the slip of the "bladed" discs also brings about an intensive cooling of the braking discs. The quantity of oil circulation within a Fottinger circuit, therefore, amounts to a multiple of that quantity of oil which is fed through the conduit 14. In this way, a high heat transfer from the discs to the oil will be realized. In combination with the cooling and the hydrodynamic braking effect, an additional mechanical braking effect at high slip will be permissible over longer periods of time without any danger. In view of the discharge of the transmitting fluid through bores 17, the heated-up oil is replaced continuously by cooling oil from conduit 14. Advantageously, the circuits are one after another passed through by liquid.

In a manner similar to that described in connection with the just referred to clutch of FIG. 1, in the brake of FIG. 2 there is in accordance with the invention combined a hydrodynamic braking effect with a frictional braking effect, while said brake is put into operation in an analogous manner. A difference in the brake of FIG. 2 over the aforementioned clutch of FIG. 1 consists in that not only is the braking housing 3' at a standstill, but also the primary as well as the secondary discs 4, 5' are "bladed" on both sides. The controllable discharge of the transmission fluid is effected through bores 17' and the stationary conduit 17a, and the said discharge may be so adjusted that the entire introduced quantity of oil will without running over be collected again and conveyed away so that the chambers 6, 8, 9' and 10' will nevertheless remain coAntinuously filled.

FIG. 3 differs from the brake of FIG. 2 merely in details. The stator discs 5' are suspended in a ring of bolts 35 fastened in the housing. Between the stator discs, sealing rings 36a, 36b are arranged. These sealing rings have an outer diameter which is so dimensioned that said sealing rings can be easily moved into the circuit of bolts 35. The inner diameter of said sealing rings 36a, 36b is so selected that they leave a sufficiently large annular chamber 9' free between the passages 6 and 8 and the sealing ring. The sealing rings are yieldable in axial direction. In one instance, (36b), the yieldability is obtained by a serpentine design of the annular cross section, whereas in another instance (36a) it is realized by inserting elastic protruding rings, for instance soft rubber rings, into annular grooves machined into the end faces. The maximum axial dimension of the sealing rings is slightly more than the axial-free distance between the two adjacent stator discs during the braking operation. When the disc packet is pressed together, the rings seal the chambers 9' toward the outside; the Fottinger circuits cannot be filled. When the pressure upon the discs decreases, the said discs are spread apart by the working pressure in the Fottinger circuits. As a result, small gaps open up between the sealing rings 36a, 36b and the stator discs 5'. These small gaps which extend along the entire circumference have a large discharge cross section through which all Fottinger circuits empty quickly. When the pressure upon the piston 11 is relieved, the flow of working and cooling liquid from conduit 14 will stop, as will be explained further below.

The safe combination of hydrodynamic and frictional torque transmission can be realized over a relationship of slip (speed difference) and tolerable slip work proportional over the entire speed range. In the diagram of FIG. 4 there is plotted over the abscissa the slip $s$ of the brake or clutch, whereas slip work $N_s$ is plotted over the ordinate. The slip and the slip work are calculated from the speed difference times transmissible torque for a constant brake moment. As will be seen from the graph, with small slip values, the component of mechanical torque and power transmission prevails. In view of the good cooling by the intensive oil circulation, this is safe and admissible over a greater period of time. By a stronger or less pressing together of the discs by means of the piston 11, it is possible to influence the torque within this range. Within the range of higher slip values, the torque is to a major extent determined by the height of the slip and the form of the passages or blades.

As an example for employing a brake according to the present invention, there may be mentioned, for instance, the control brake for the first velocity range of a hydrodynamic mechanical compound transmission of an omnibus with a torque converter and successive planetary gear transmission stages which are adapted to be controlled by brakes or clutches. It is a well-known fact that internal combustion engine driven motor vehicles also brake by means of the motor. In such an instance, the vehicle drives the transmission. In this connection, the turbine of the torque converter may be used as hydrodynamic brake. When the turbine is coupled by means of a rigid transmission, for instance by a control brake in engaged position of the velocity range used, to the vehicle driving axle, for each driving velocity there will be obtained a certain and generally very high braking moment which is dependent on the speed of the turbine and consequently on the driving speed. For applying a braking force of any desired magnitude with a certain driving speed, it is possible, in view of the safe slip possibility of a control brake according to the invention, to vary the turbine speed. Since in this connection the frictional torque transmission is controlled by controlling the hydraulic pressure acting on the pressing piston, it will be appreciated that when changing the oil pressure, a delay-free change in the brake member will be obtained.

FIGS. 5a and 5b illustrate a favorable design of the passages in the discs, said passages 6, 8 and the blades being shown in a section perpendicular to the shaft and indicated in FIG. 2 by the section lines Va–Va and Vb–Vb. These passages, according to the said section, are strongly curved, and the primary passages are arranged as image to the passages of the secondary discs in such a manner that the hollow side of said curve points in the direction of movement. Between the passages there remain highly curved webs of a thickness different from the thickness of the blades 20 and 21.

The diagram of FIG. 6 illustrates a clutch 22 having the primary part 2 thereof connected to the secondary part 3 by means of a disc packet 1 designed in conformity with FIGS. 1, 2 or 3, with a pressing piston 11 being provided for pressing the discs against each other. The discharged or running-over quantity of oil is collected in the collector vessel 23 and through return conduits 24 and return feeding pump 25 is conveyed to the cooler 26 from where the said quantity of oil passes into the reservoir 27. The reservoir 27 either represents a pressure accumulator (gravity tank, air vessel) or it is followed by a feeding pump.

By depressing the pedal 28, the piston 11 for the discs is through the interposed hydrostatic transmission member 29, 12a, 12 subjected to pressure and simultaneously communication is established between the reservoir 27 and the filling conduit through the opening of the automatically returning shutoff valve 30. The quantity of oil circulating in the circuit 30, 14, 1, 24, 25, 26, 27 depends on the cooling requirements of the clutch and the frequency at which it is shifted and can be adjusted by means of the throttle 31.

It is, of course, to be understood, that the present invention is, by no means, limited to the particular arrangement shown in the drawings, but also comprises modifications, the invention being determined by the scope of the appended claims.

I claim:

1. A device for resisting relative rotary motion between relatively rotatable parts such as a clutch and brake system, especially a brake system for planetary gear transmissions, which includes: primary hub means comprising primary friction disc means, secondary housing means comprising secondary friction disc means in substantial axial alignment with said primary friction disc means, said primary and secondary friction disc means respectively being provided with two groups of channel means being respectively machined into said primary and secondary friction disc means, and annular disc-shaped wall means associated with at least one of the two cooperating friction disc means for separating from each other two axially adjacent channel means respectively pertaining to adjacent friction disc means and annular chamber means respectively located radially inwardly and outwardly of said group of channel means and forming a toroidal fluid flow circuit means therewith, and control means operable selectively to move said primary and secondary friction disc means relatively toward each other for effecting mechanical braking moment while simultaneously making said two groups of channel means effective to bring about a hydrodynamic braking moment, said control means including a fluid operable piston reciprocably mounted selectively in said housing means respectively in said hub means and operably to convey pressure to said primary and secondary friction disc means for pressing the same against each other to bring about frictional engagement of said friction disc means, said control means also including automatic means operatively connected to said circuit for filling the same with fluid simultaneously with the action of said control means to bring about hydrokinetic engagement of said toroidal fluid flow circuit means.

2. An arrangement according to claim 1, in which each of said adjacent channel means of said groups of channel means has a cross section which, transverse to the longitudinal extension of the respective channel means, is of approximately rectangular contour and remains approximately constant over its radial extension.

3. An arrangement according to claim 2, in which each of said channel means of one of said two groups is curved in opposite direction to the channel means of the other group of channel means, the radially outer ends of the channel means of said groups pointing in a direction opposite to the direction of rotation of the respective pertaining friction disc means.

4. An arrangement according to claim 1, which includes axially compressible sealing ring means substantially sealing said radially outwardly located annular chamber means toward the outside, the axial compressibility of said sealing ring means being such as to cause said sealing ring means still to effectively seal when the respective adjacent friction disc means have worn by the normal permissible service wear.

5. An arrangement according to claim 1, which includes means for continuously passing working fluid through said Fottinger circuit while said friction disc means are frictionally engaged.

6. An arrangement according to claim 1, which comprises a plurality of fluid flow circuits, and in which said last-mentioned circuits are passed through by working fluid one after the other.